United States Patent [19]
Ichinohe et al.

[11] Patent Number: 5,331,770
[45] Date of Patent: Jul. 26, 1994

[54] METHOD FOR SCRAPING OFF EXCESSIVE PORTION OF WORKPIECE

[75] Inventors: Masayuki Ichinohe, Yokohama; Koichi Sugimoto, Hiratsuka; Kazuo Yamaguchi, Sagamihara; Genji Itoh; Kenji Maeda, both of Funabashi; Kouichiro Ohara, Narashino, all of Japan

[73] Assignee: Hitachi, Ltd., Tokyo, Japan

[21] Appl. No.: 904,002

[22] Filed: Jun. 24, 1992

[30] Foreign Application Priority Data

Jul. 26, 1991 [JP] Japan .................................. 3-187249
Jun. 1, 1992 [JP] Japan .................................. 4-140259

[51] Int. Cl.⁵ ............................................ B24B 49/00
[52] U.S. Cl. ............................... 51/165.71; 51/165.74; 51/165.77; 51/165.87; 51/281 R
[58] Field of Search ........... 51/165.71, 165.72, 165.77, 51/165.85, 165.9, 281 R, 165.87; 318/570, 571, 568.11, 568.13, 568.12

[56] References Cited

U.S. PATENT DOCUMENTS

| | | | |
|---|---|---|---|
| 4,523,409 | 6/1985 | Defasio | 51/165.77 |
| 4,524,419 | 6/1985 | Headlund | 51/165.72 |
| 4,549,276 | 10/1985 | Inaba | 318/568.13 |
| 4,620,436 | 11/1986 | Hirabayashi et al. | 73/1 B |
| 4,753,048 | 6/1988 | Asada et al. | 51/165.77 |
| 4,777,769 | 10/1988 | McLaughlin et al. | 51/165.71 |
| 4,810,945 | 3/1989 | Yoneda | 51/165.71 |
| 4,848,038 | 7/1989 | Maruyama | 51/165.71 |
| 4,907,371 | 3/1990 | Sheda et al. | 51/165.71 |
| 4,926,309 | 5/1990 | Wu | 318/571 |
| 5,055,752 | 10/1991 | Leishensnider | 318/570 |
| 5,077,941 | 1/1992 | Whitney | 51/165.87 |
| 5,126,645 | 6/1992 | Yoshimi | 318/568.11 |

FOREIGN PATENT DOCUMENTS 62-246465 10/1987 Japan .

Primary Examiner—M. Rachuba
Attorney, Agent, or Firm—Fay, Sharpe, Beall, Fagan, Minnich & McKee

[57] ABSTRACT

In a method for scraping off automatically an excessive portion of a workpiece by a cutting tool, a surface shape of the excessive portion of the workpiece is measured, a cross-sectional area variation of the excessive portion along a feed course in which the cutting tool will proceed during a cutting operation thereof is calculated from the measured surface shape of the excessive portion, and the excessive portion is scraped off in the feed course with a feed speed of the cutting tool which is changed in accordance with the calculated cross-sectional area variation of the excessive portion along the feed course, so that the larger the calculated cross-sectional area of the excessive portion is, the smaller the feed speed of the cutting tool is, and the smaller the calculated cross-sectional area of the excessive portion is, the larger the feed speed of the cutting tool is.

37 Claims, 13 Drawing Sheets

F I G. 1
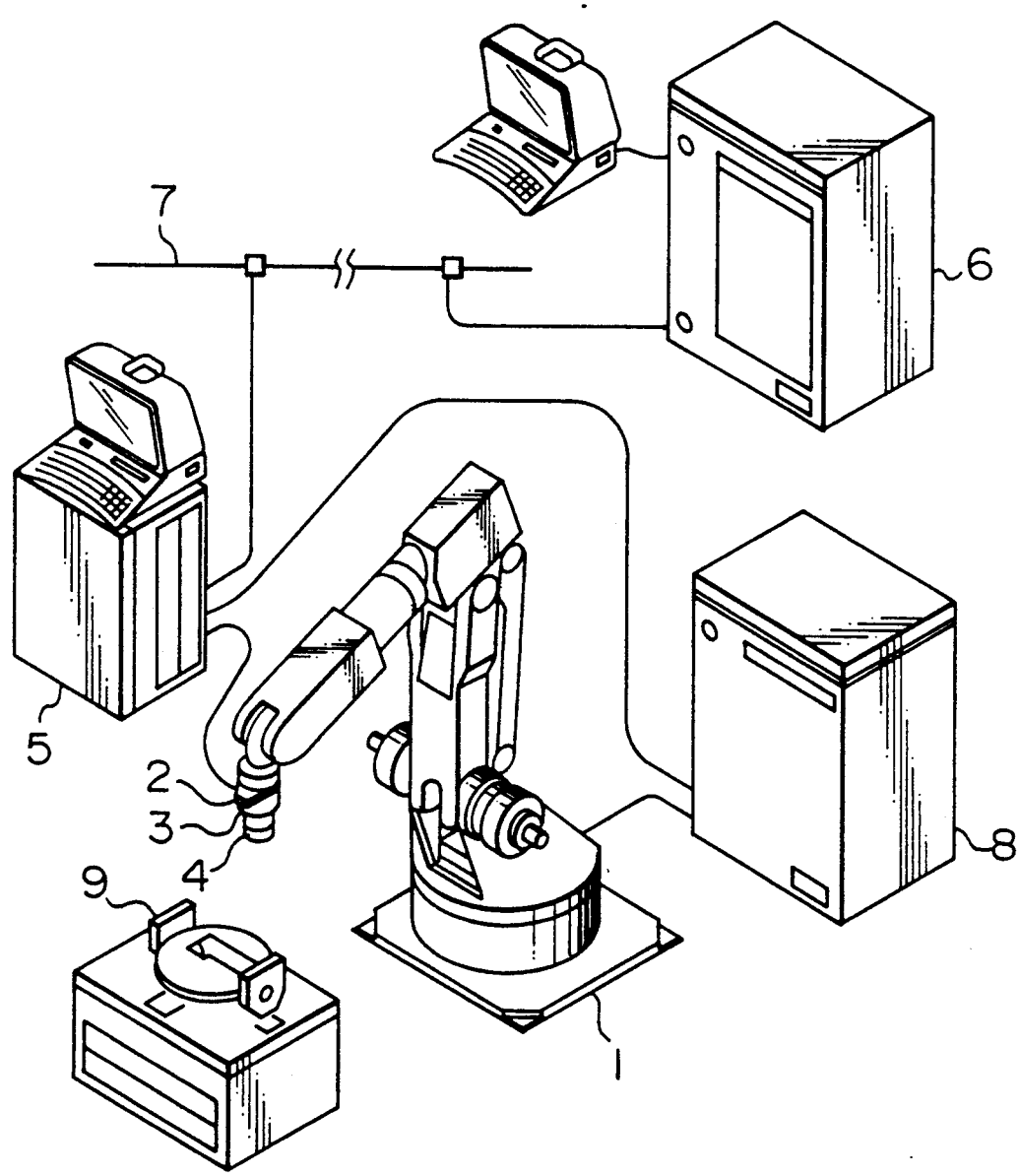

MEASURING PLANE
=CUTTING PLANE

MEASURING PLANE
=CUTTING PLANE

EXCESSIVE PORTION
ON EDGE

EXCESSIVE PORTION
ON PLANE

FIG. 13
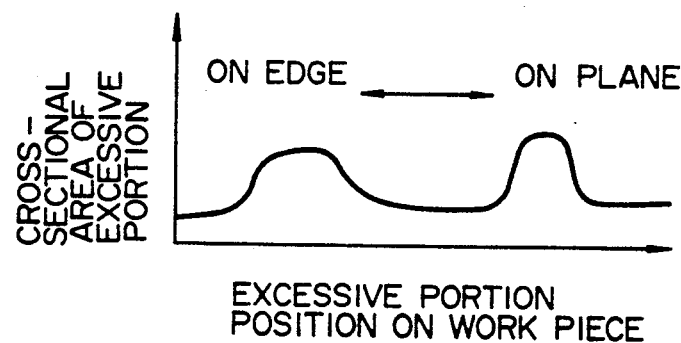
FIG. 14
| | ON EDGE | ON PLANE |
|---|---|---|
| OPTIMUM PRESSING FORCE | 15N | 20N |
FIG. 16
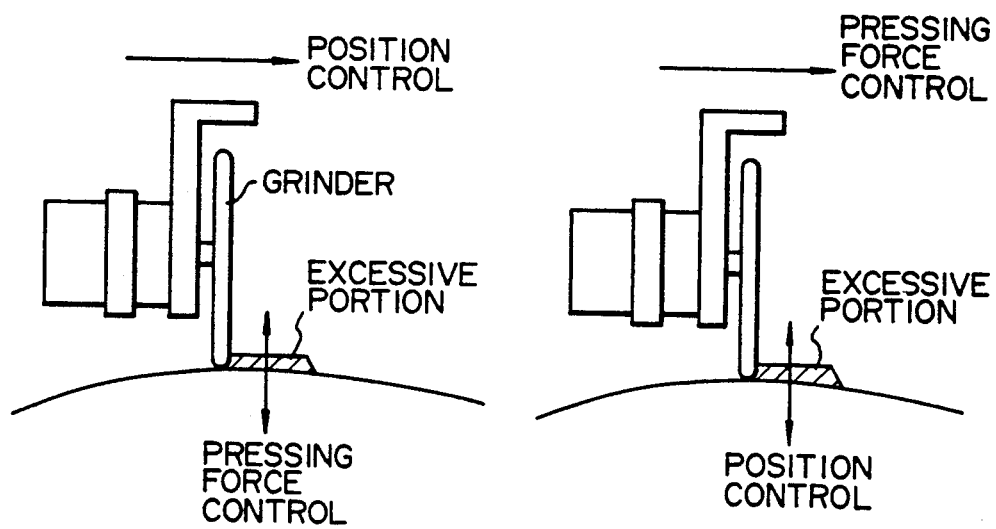

F I G. 20
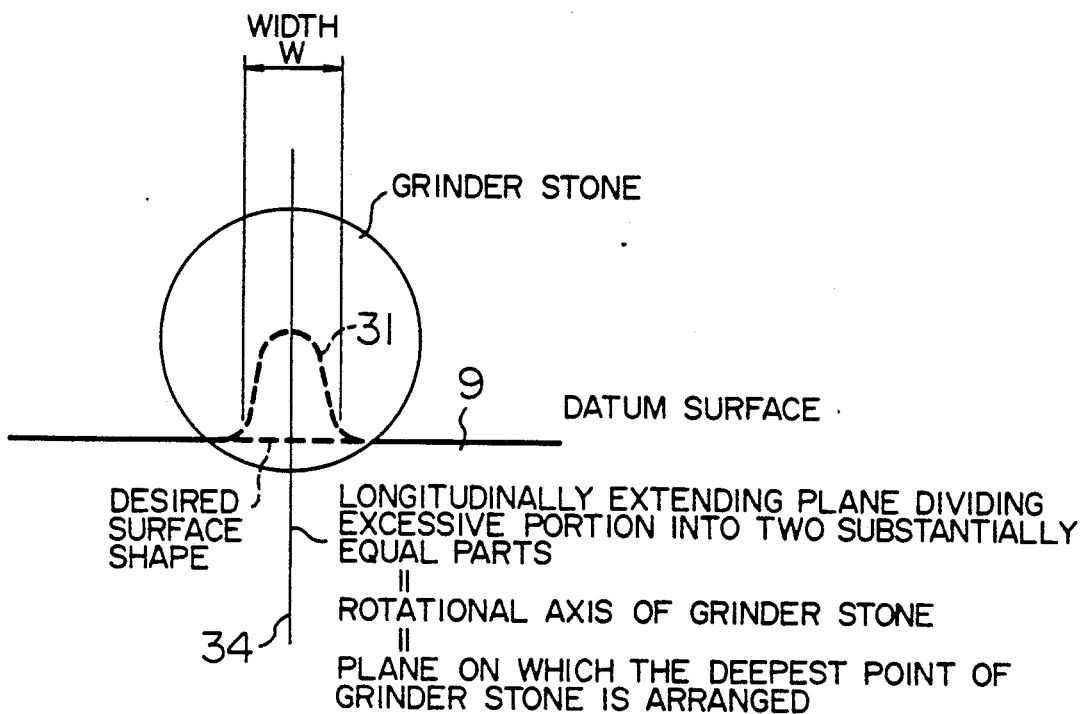
F I G. 21
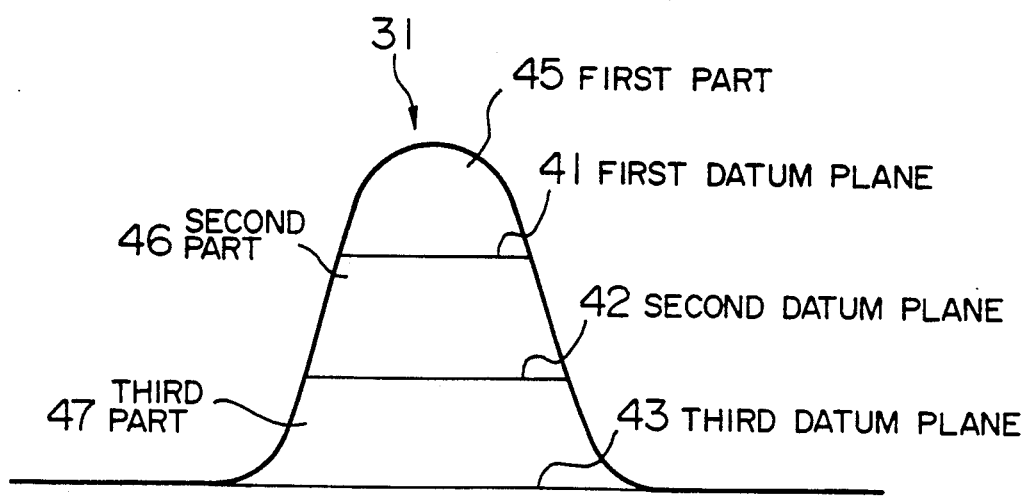

METHOD FOR SCRAPING OFF EXCESSIVE PORTION OF WORKPIECE

BACKGROUND OF THE INVENTION AND RELATED ART STATEMENT

The present invention relates to a method for scraping off automatically an excessive portion, for example, a burr, a bead weld or the like, of a workpiece.

In a conventional method for scraping off automatically the excessive portion of the workpiece, as disclosed in Japanese Patent Unexamined Publication No. 62-246465, a surface shape measuring sensor mounted on a forward end of a robot hand measures a central line, height and width of a bead weld of a workpiece, a desired surface shape under the bead weld is calculated thereon, and a cutting tool is pressed repeatedly against the bead weld with a constant pressing force range to scrape off the bead weld until the desired surface shape is obtained.

OBJECT AND SUMMARY OF THE INVENTION

An object of the present invention is to provide a method for scraping off an excessive portion with an optimum condition for a cutting tool.

According to the present invention, a method for scraping off automatically an excessive portion of a workpiece by a cutting tool, comprises the steps of:

measuring a surface shape of the excessive portion of the workpiece, calculating a cross-sectional area variation of the excessive portion along a feed direction on which the cutting tool will proceed during a cutting operation thereof, on the basis of the measured surface shape of the excessive portion, and scraping off the excessive portion in the feed direction with a feed speed of the cutting tool which is changed in accordance with the calculated cross-sectional area variation of the excessive portion along the feed direction, so that the larger the calculated cross-sectional area of the excessive portion is, the smaller the feed speed of the cutting tool is, and the smaller the calculated cross-sectional area of the excessive portion is, the larger the feed speed of the cutting tool is.

In the present invention, since the excessive portion is scraped off in the feed direction with the feed speed of the cutting tool which is changed in accordance with the calculated cross-sectional area variation of the excessive portion along the feed direction so that the larger the calculated cross-sectional area of the excessive portion is, the smaller the feed speed of the cutting tool is and the smaller the calculated cross-sectional area of the excessive portion is, the larger the feed speed of the cutting tool is, the larger an area on which the cutting tool contacts with the excessive portion to scrape off the excessive portion (corresponding to the calculated cross-sectional area of the excessive portion) is, the smaller the feed speed of the cutting tool is, and the smaller the area on which the cutting tool contacts with the excessive portion to scrape off the excessive portion is, the larger the feed speed of the cutting tool is. Therefore, a scraping rate of the excessive portion by the cutting tool (an amount of the excessive portion scraped off by the cutting tool per time unit $\approx$ the feed speed of the cutting tool $\times$ the calculated cross-sectional area of the excessive portion (corresponding to the area on which the cutting tool contacts with the excessive portion to scrape off the excessive portion)) is kept at a constant degree or varies within a small range, so that the optimum cutting condition of the cutting tool is obtained.

BRIEF DESCRIPTION OF THE DRAWINGS

FIG. 1 is a schematic view showing a robot system to which the automatic excessive portion scraping off method according to the present invention is applied.

FIG. 13 is a diagram showing a relation between a surface position on the workpiece and the cross-sectional area of the excessive portion with distinction between the excessive portion on the edge of the workpiece and the excessive portion on the plane of the workpiece.

FIG. 14 is a table showing an optimum pressing force of the cutting tool on the excessive portion on the edge and an optimum pressing force of the cutting tool on the excessive portion on the plane.

FIG. 16 is a schematic view showing a case in which a position or speed of the cutting tool in the feed direction of the cutting tool and a pressing force of the cutting tool in a direction perpendicular to the desired surface are controlled and a position or speed thereof in the direction perpendicular to the desired surface and a feed force in the feed direction are not controlled to scrape off the excessive portion, and a case in which position or speed thereof in the feed direction and the pressing force in the direction perpendicular to the desired surface are not controlled and the position or speed thereof in the direction perpendicular to the desired surface and the feed force in the feed direction are controlled to scrape off the excessive portion.

FIG. 20 is a schematic view showing a relation among an imaginary face which divides the cross-sectional area of width of the excessive portion into two equal parts, a rotational axis of the rotational cutting tool arranged on a imaginary face and the deepest point of the rotational cutting tool arranged on the imaginary face.

FIG. 21 is a schematic view showing a plurality of parts of the excessive portion, which parts are defined by a plurality of datum lines and are scraped off along the datum lines respectively with respective feed speeds determined according to the cross-sectional areas of the parts of the excessive portion.

DETAILED DESCRIPTION OF PREFERRED EMBODIMENTS

Figure 2:
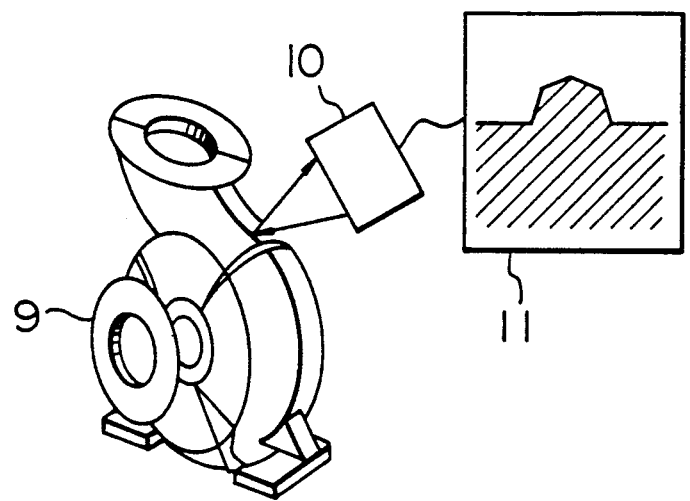
FIG. 2 is a schematic view showing a surface shape measuring sensor for measuring a shape of an excessive portion of a workpiece.

The present invention can be applied to a finishing robot system as shown in FIG. 1. A hand of a robot 1 has a rotational grinding tool 4, a surface shape measuring sensor 2 and a force sensor 3 for measuring a pressing force of the grinding tool 4 against a workpiece 9. An action of the robot 1 is controlled by a robot controller 8. The workpiece 9 is fixed with a position and attitude predetermined in relation to the robot 1. A desired shape data (design shape data), a material data, a desired shape accuracy data and so forth of the workpiece 9 are recorded in a host computer 6. The design shape data is transferred from the host computer to a terminal computer 5 through a data line 7 so that an action sequence of the robot 1 for measuring a surface shape of an excessive portion of the workpiece 9 by the surface shape measuring sensor 2 is calculated from the transferred design shape data and an action sequence of the robot 1 for scraping off the excessive portion of the workpiece 9 by the rotational grinding tool 4 is calculated from the measured surface shape of the excessive portion. The robot controller 8 controls the action of the robot 1 on the basis of the calculated action sequences.

When the action sequence of the robot 1 for measuring the surface shape of the excessive portion by the surface shape measuring sensor 2 is calculated, at first, an operator points out a position of the workpiece 9 which forms probably the excessive portion (a divisional line of a mold, a bead weld or the like), and the pointed-out position is inputted to the host computer 6. The host computer 6 calculates a desired surface shape data of the pointed-out position on the basis of the design data. On the basis of the calculated surface shape data of the pointed-out position, the terminal computer 5 calculates a desired line along which the surface shape measuring sensor 2 proceeds to measure the surface shape of the excessive portion. As shown in FIG. 20, the surface shape measuring sensor 2 and a rotational axis of the rotational grinding tool 4 proceeds along an imaginary face 34 which divides the cross-sectional area or width of the excessive portion 31 into two equal parts and extends substantially perpendicularly to a tangent plane of the desired surface under the excessive portion 31. But, it is not requisite for the present invention that the surface shape measuring sensor 2 and the rotational axis of the rotational grinding tool 4 proceeds correctly along the imaginary face 34. The surface shape measuring sensor 2 and the rotational axis of the rotational grinding tool 4 may proceed parallel to a longitudinal direction of the excessive portion 31 without a significantly large distance between the excessive portion 31 and the surface shape measuring sensor 2 or the rotational axis of the rotational grinding tool 4 in a direction perpendicular to the longitudinal direction of the excessive portion 31. That is, in the present invention, the feed speed of the grinding tool 4 may be controlled according to the shape or cross-sectional area of the excessive portion 31 roughly measured or calculated in the longitudinal direction of the excessive portion 31. A distance between the desired surface shape of the workpiece 9 and the surface shape measuring sensor 2 and a distance between the desired surface shape of the workpiece 9 and the grinding tool 4 are kept at respective constant degrees. The desired line along which the surface shape measuring sensor 2 proceeds to measure the surface shape of the excessive portion 31 is substantially equal to the desired line along which the grinding tool 4 proceeds to scrape off the excessive portion 31. The rotational axis of the rotational grinding tool 4 may be included by a plane including the imaginary face 34, or the deepest point of the grinding tool 4 may be included by the plane including the imaginary line 34. When a laser spot sensor is used as the surface shape measuring sensor 2 as shown in FIG. 2, the laser spot sensor measures the surface shape of the excessive portion 31 with a scanning operation on a measuring plane so that a distance between the laser spot sensor and each of points of the workpiece 9 on which the laser beam is projected is measured by using the principle of trigonomerical survey. It is preferable that an angle between the measuring plane and the tangent plane of the desired surface under the excessive portion 31 is kept at a constant degree and a cross line which is passed by both of the measuring plane and the tangent plane of the desired surface under the excessive portion 31 extends substantially perpendicularly to the imaginary face 334 and the longitudinal direction of the excessive portion 31.

The terminal computer 5 calculates the action sequence of the robot 1 in consideration of the position and attitude of the workpiece 9 on the basis of the desired line along which the surface shape measuring sensor 2 proceeds to measure the surface shape of the excessive portion. An image processor converts the measured distances between the laser spot sensor and the points of the workpiece 9 on which the laser beam is projected on the measuring plane to the surface shape of the workpiece 9 measured on the measuring plane. The measuring plane moves with the surface shape measuring sensor 2 to measure a whole shape of the excessive portion 31, and a cross-sectional shape or area data of the excessive portion 31 on an imaginary plane with a desired position and attitude thereof is calculated from the measured whole shape of the excessive portion 31. Therefore, a variation of the cross-sectional shape or area data of the excessive portion 31 on the imaginary plane with the desired position and attitude thereof along the desired line on which the grinding tool 4 proceeds to scrape off the excessive portion 31 can be calculated.

Figure 3:
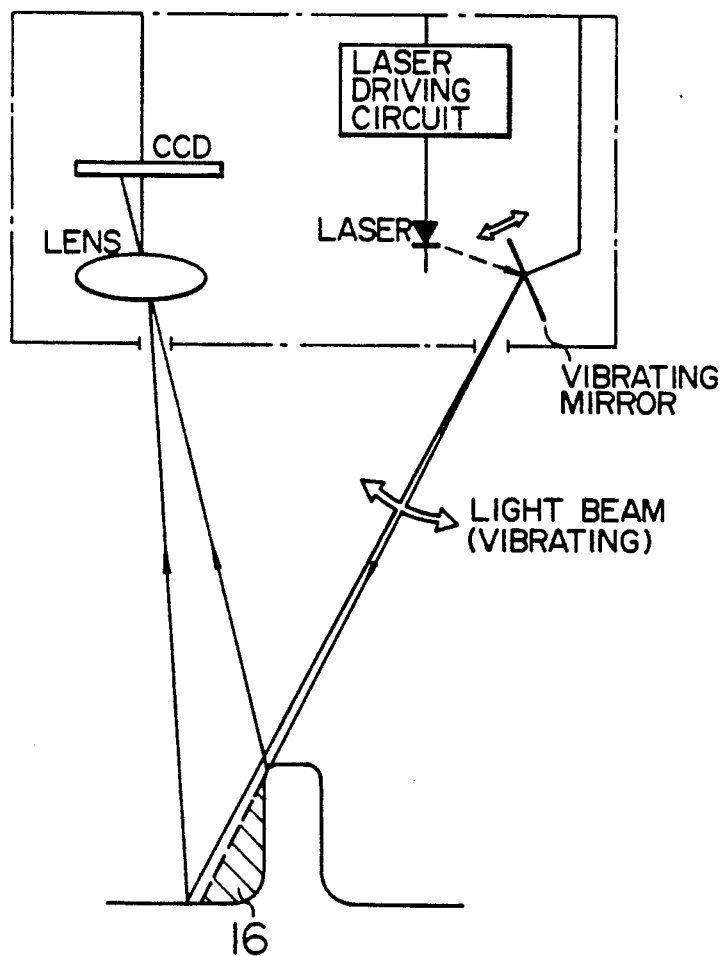
FIG. 3 is a schematic view showing a main structure of the surface shape measuring sensor and a surface range which cannot be measured by the surface shape measuring sensor.
Figure 7:
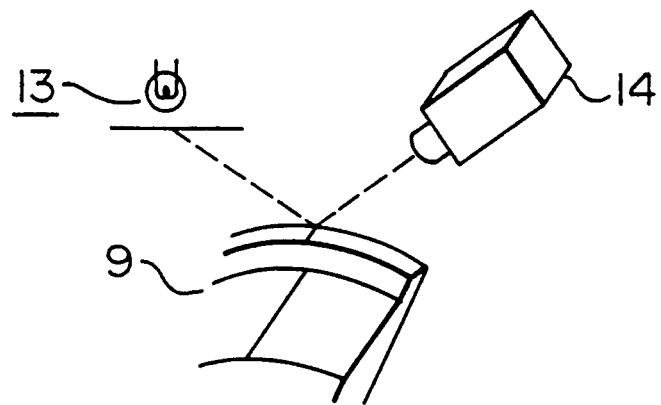
FIG. 7 is a schematic view showing a scanning camera for measuring the cross-sectional shape of the excessive portion.
Figure 8:
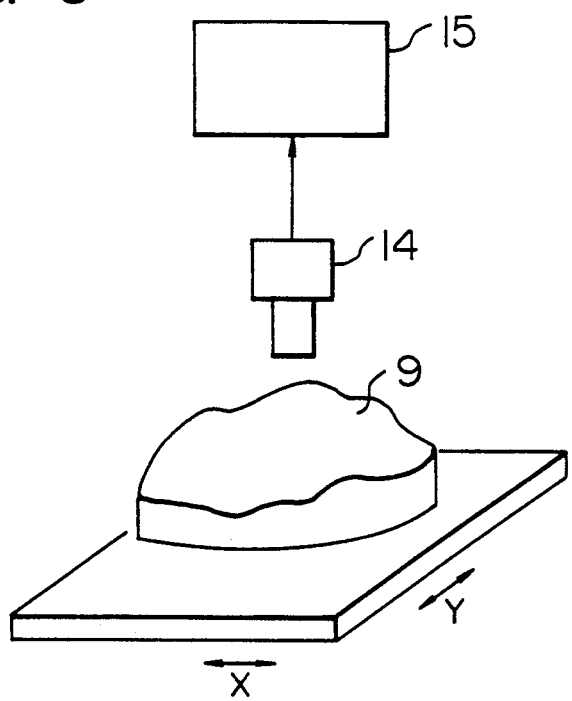
FIG. 8 is a schematic view showing the surface shape measuring sensor mounted on an apparatus other than the robot with a cutting tool.

As shown in FIG. 3, when the surface shape measuring sensor 2 proceeds on a predetermined line to measure the surface shape of the excessive portion 31, the surface shape measuring sensor 2 cannot measure a part of the surface shape of the excessive portion 31 facing to a range 16. Therefore, it is preferable that a plurality of the surface shape measuring sensors 2 are arranged in a direction substantially perpendicular to the predetermined line on which the surface shape measuring sensor 2 proceeds. As shown in FIG. 7, a combination of a slit light source 13 and an image recording sensor 14 may be used to measure the surface shape of the excessive portion 31 as the surface shape measuring sensor 2. As shown in FIG. 8, an image recording apparatus 15 other than the robot 1 may be used to measure the surface shape of the excessive portion 31. The surface shape measuring sensor 2 may be always fixed to the hand of the robot 1, or alternatively may be exchanged for the grinding tool 4.

The operator may input directly the action sequence of the robot 1 to the terminal computer 5 through the robot controller 8. The action sequence of the robot 1 may be determined by recording an actual action of the robot 1 obtained when the operator drives the hand of the robot 1 to move on a suitable line for measuring the surface shape of the excessive portion 31 by the surface shape measuring sensor 2.

Figure 4:
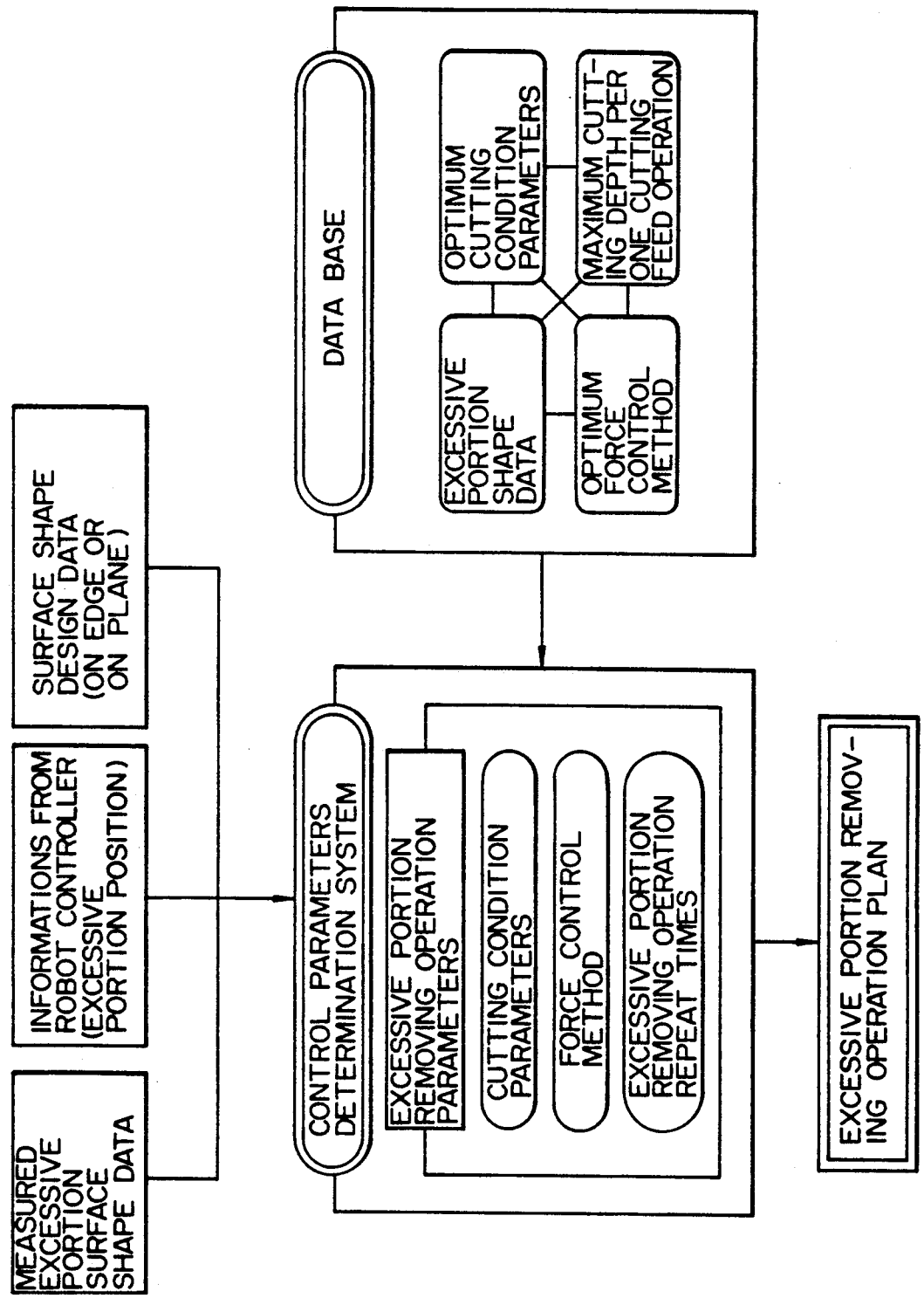
FIG. 4 is a flowchart for determining control parameters on the basis of the shape of the excessive portion.

As shown in FIG. 4, the action sequence or control parameters of the robot 1 for moving the grinder tool 4 to scrape off the excessive portion 31 is calculated in consideration of a predetermined data base from a relation among the variation of the surface shape data of the excessive portion 31 measured on the measuring plane of the surface shape measuring sensor 2 along the longitudinal direction of the excessive portion 31, the variation of position of the measuring plane of the surface shape measuring sensor 2 along the longitudinal direction of the excessive portion 31 and the desired surface shape of the workpiece 9 under the excessive portion 31.

Figure 5:
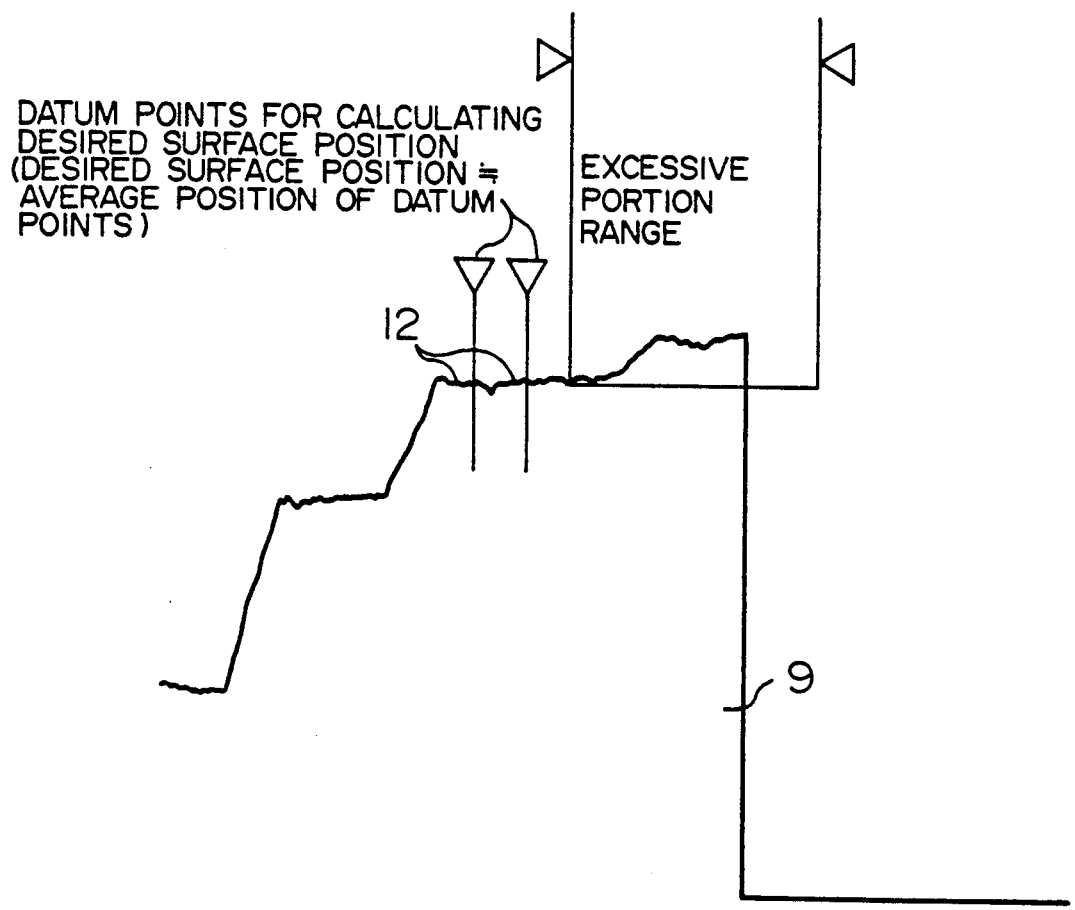
FIG. 5 is a schematic view showing an example of a desired or datum surface shape.
Figure 6:
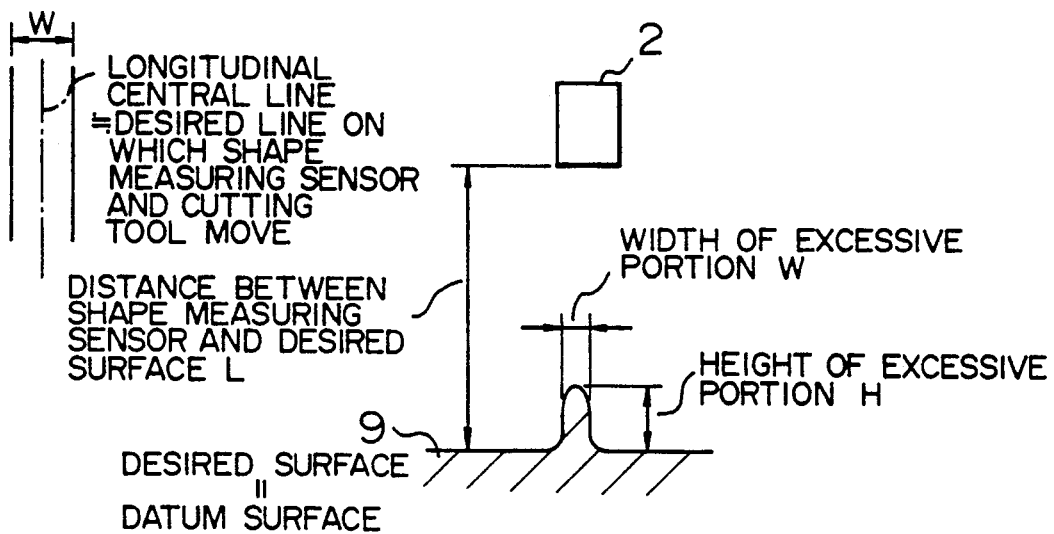
FIG. 6 is a schematic view showing a cross-sectional shape of the excessive portion measured by the surface shape measuring sensor.

In an example of calculation of the cross-sectional area of the excessive portion 31 from the measured surface shape data of the excessive portion 31 as shown in FIG. 5, at first, a datum dividing line for distinguishing the excessive portion 31 from the desired surface shape of the workpiece 9 is determined. The measured surface shape data of the workpiece 9 on the measuring plane is compared with the design shape data to divide the measured surface shape into a non-excessive-portion part and an excessive-portion part. The datum dividing line extends parallel to the desired surface shape and on an intermediate point between two points 12 on the non-excessive-portion part. The datum dividing line may be determined from the position and attitude of the hand of the robot 1 and the measured surface shape data obtained while the surface shape measuring sensor 2 moves, or alternatively may be determined after the whole of the surface shape of the excessive portion 31 is measured. The datum dividing line may be included by the desired surface shape of the workpiece 9 or an actual surface of the non-excessive-portion part.

The cross-sectional area of the excessive portion 31 may be equal to an actual cross-sectional area of the excessive portion 31 divides from the desired surface shape of the workpiece 9, or alternatively may be composed of the actual cross-sectional area of the excessive portion 31 divided from the desired surface shape of the workpiece 9 and a cross-sectional area of a part of the workpiece 9 which will be scraped off by the grinding tool 4 under the excessive portion 31 as shown in FIG. 20.

It is preferable that an angle between an imaginary cross-sectional plane on which the variation of the cross-sectional area of the excessive portion 31 along the feed course of the grinding tool 4 for the control of the feed speed of the grinding tool 4 is calculated and the tangent plane of the desired surface under the excessive portion 31 or a plane extending parallel to the desired surface under the excessive portion 31 is kept at a constant degree and a cross line included by both of the imaginary cross-sectional plane and the tangent plane of the desired surface under the excessive portion 31 or the plane extending parallel to the desired surface under the excessive portion 31 extends substantially perpendicularly to the imaginary line 34 and the longitudinal direction of the excessive portion 31. The angle between the imaginary cross-sectional plane and the tangent plane of the desired surface under the excessive portion 31 or the plane extending parallel to the desired surface under the excessive portion 31 may be 90 degree, or alternatively may be substantially equal to an angle between a forward end cutting plane which will be formed by the grinding tool 4 on the workpiece 9 with a contact or cutting action therebetween and will extend obliquely to the feed course of the grinding tool 4 and the tangent plane of the desired surface under the excessive portion 31 or the plane extending parallel to the desired surface under the excessive portion 31. The angle between the imaginary cross-sectional plane and the tangent plane of the desired surface under the excessive portion 31 or the plane extending parallel to the desired surface under the excessive portion 31 is preferably 45 degrees.

The surface shape measuring sensor 2 measures a distance between the surface shape measuring sensor 2 and the surface of the workpiece 9. Alternatively, the position and attitude of the hand of the robot 1 obtained when the force sensor 3 detects a small force generated by a contact between a pin fixed to the hand of the robot 1 and each of various points on the workpiece 9 are recorded so that the surface shape of the workpiece 9 is calculated from the positions and attitudes of the hand of the robot 1 corresponding to the various points on the workpiece 9.

Figure 9:
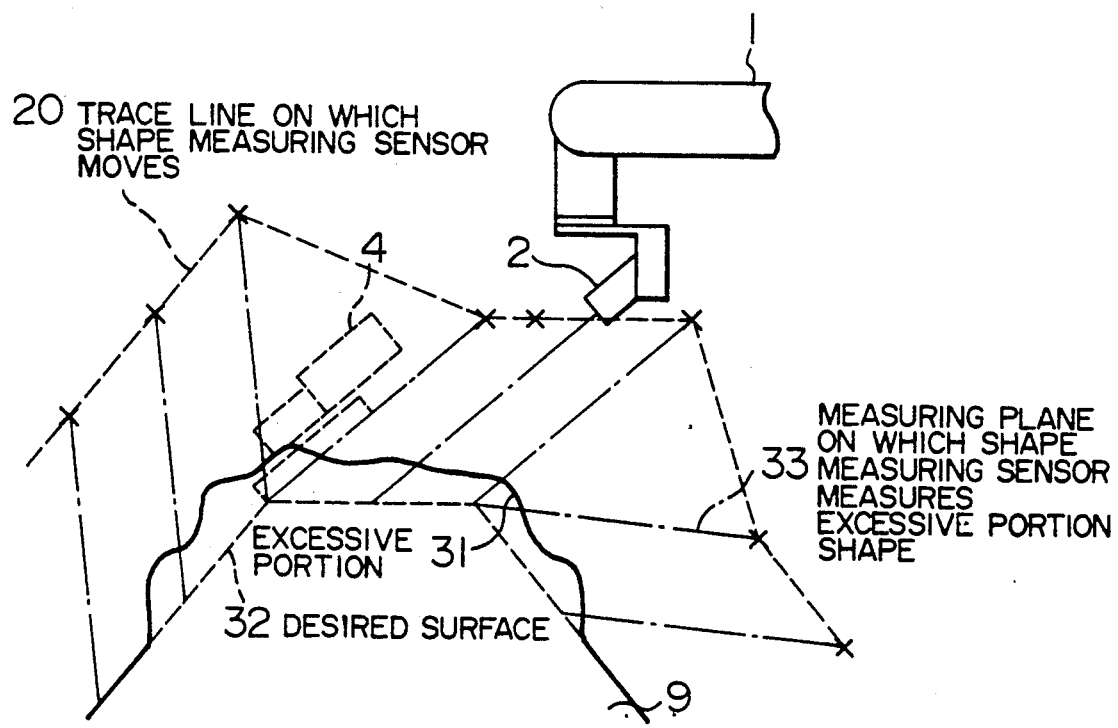
FIG. 9 is a schematic view showing the surface shape measuring sensor along which the cutting tool will scrape off the excessive portion.
Figure 11:
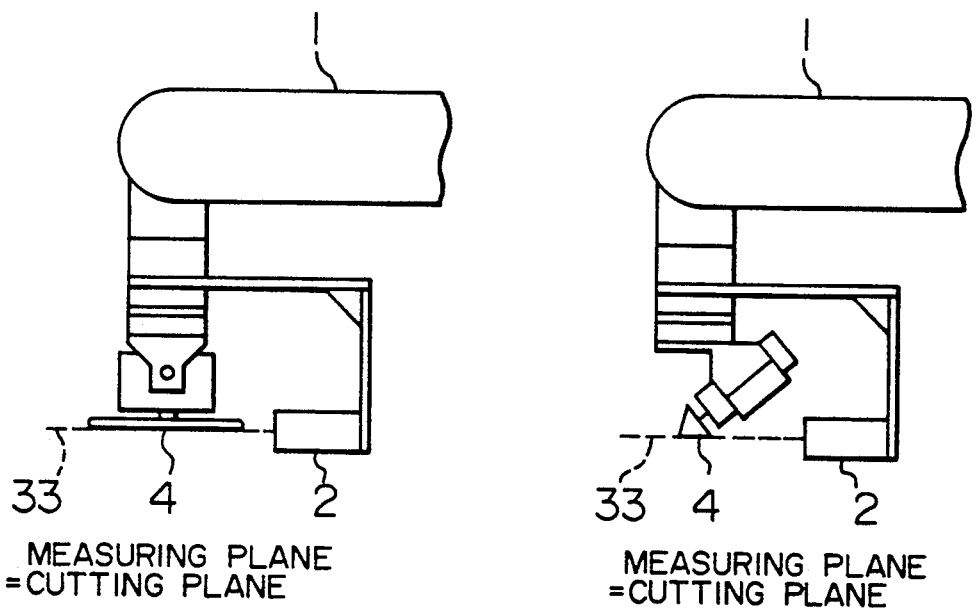
FIG. 11 is a schematic view showing a preferable arrangement between the cutting plane of the cutting tool and the surface shape measuring sensor.

It is preferable that an angle between the measuring plane 33 and the tangent plane 32 of the desired or design surface of the workpiece 9 is kept at a predetermined degree, and the cross line included by both of the measuring plane 33 and the tangent plane 32 extends substantially perpendicularly to the imaginary face 34 and the longitudinal direction of the excessive portion 31, as shown in FIG. 9. If the measuring plane 33 is included by the imaginary cross-sectional plane on which the variation of the cross-sectional area of the excessive portion 31 along the feed course of the grinding tool 4 is calculated, the surface shape of the workpiece 9 measured on the measuring plane 33 directly corresponds to the cross-sectional shape of the excessive portion 31 on the imaginary cross-sectional plane so that the variation of the cross-sectional area of the excessive portion 31 along the feed course of the grinding tool 4 on the imaginary cross-sectional plane can be easily calculated. If the measuring plane 33 is included by the forward end cutting plane as shown in FIGS. 9 and 11, the surface shape of the workpiece 9 measured on the measuring plane 33 directly corresponds to the cross-sectional shape of the excessive portion 31 on the forward end cutting plane so that the variation of the cross-sectional area of the excessive portion 31 along the feed course of the grinding tool 4 on the forward end cutting plane can be easily calculated. When the forward and cutting plane is included by the imaginary cross-sectional plane, a conversion of the surface shape of the workpiece 9 on imaginary cross-sectional plane to the variation of the cross-sectional area of the excessive portion 31 along the feed course of the grinding tool 4 on the forward end cutting plane is not necessary so that the excessive portion 31 can be effectively scraped off by the grinding tool 4 along the feed course thereof.

Figure 10:
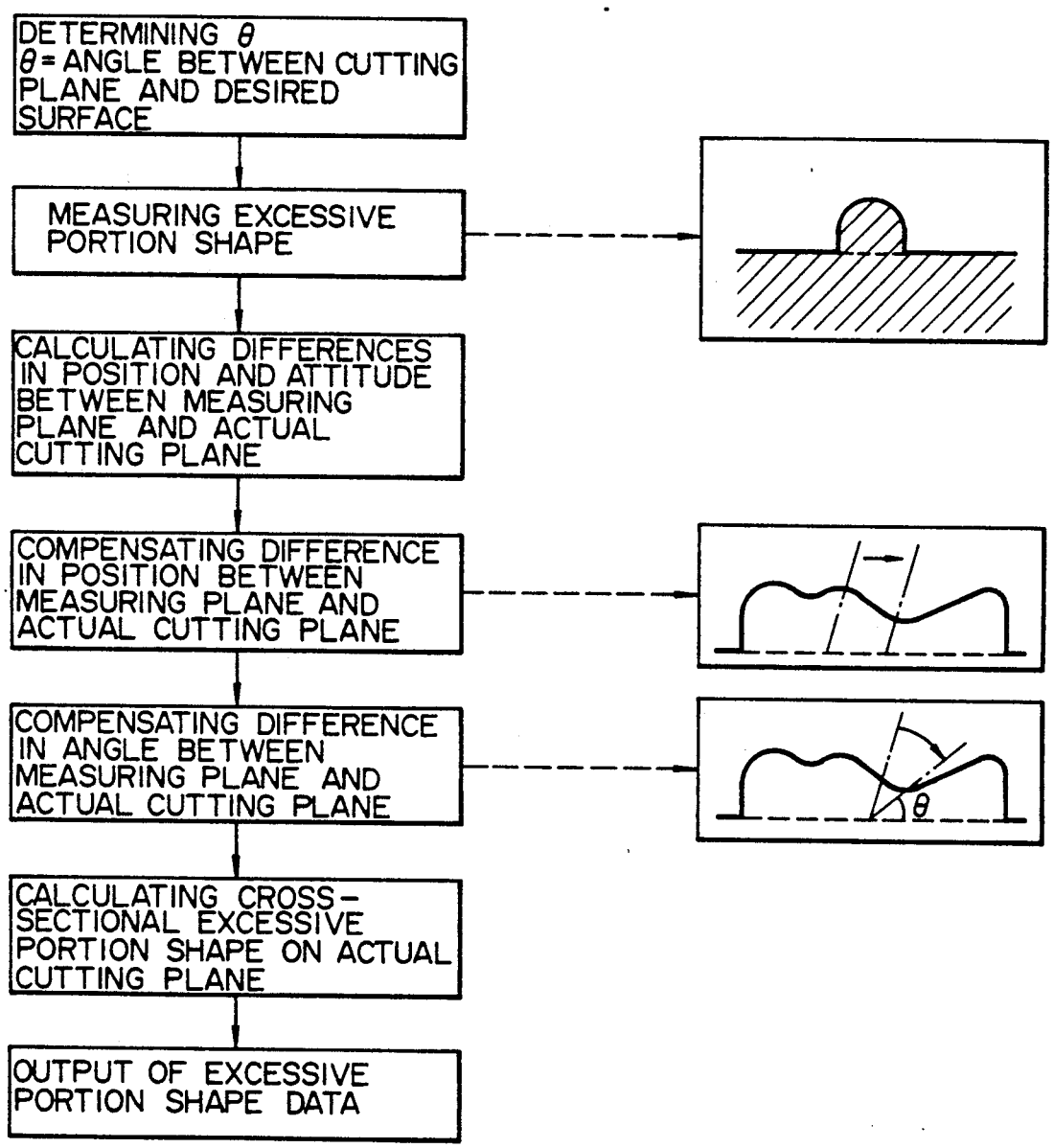
FIG. 10 is a flowchart for calculating the cross-sectional shape of the excessive portion taken along a plane with a desired position and attitude relative to the workpiece.

It is preferable that the measuring plane 33 is included by both of the imaginary cross-sectional plane and the forward end cutting plane, however, if not, the surface shape data measured on the measuring plane 33 is converted to the variation of the cross-sectional area of the excessive portion 31 on the forward end cutting plane along the feed course of the grinding tool 4, as shown in FIG. 10. At first, differences in attitude and position between the measuring plane 33 and the forward end cutting plane in a direction of the feed course of the grinding tool 4 is measured and/or calculated. When the position of the measuring plane 33 is different from that of the forward end cutting plane in the direction of the feed course of the grinding tool 4, the position of the imaginary cross-sectional plane is adjusted by the difference in position between the measuring plane 33 and the forward end cutting plane so that the position of the imaginary cross-sectional plane becomes identical to that of the forward end cutting plane. When the attitude of the measuring plane 33 is different from that of the forward end cutting plane, the attitude of the imaginary cross-sectional plane is adjusted by the difference in attitude between the measuring plane 33 and the forward end cutting plane so that the attitude of the imaginary cross-sectional plane becomes identical to that of the forward end cutting plane. When the cross-sectional area of the excessive portion 31 on the imaginary cross-sectional plane is calculated while the attitude and position of the imaginary cross-sectional plane are identical to those of the forward end cutting plane, the cross-sectional area of the excessive portion 31 on the forward end cutting plane is calculated. Therefore the variation of the cross-sectional area of the excessive portion 31 on the forward end cutting plane along the feed course of the grinding tool 4 is calculated.

When the cross-sectional area of the excessive portion 31 is significantly large and it is necessary for the excessive portion 31 to be scraped off by a plurality of feed operations of the grinding tool 4 along the feed course thereof, as shown in FIG. 21, a plurality of datum lines parallel to the desired surface shape are set in a height direction of the excessive portion 31. A part 45 of the excessive portion 31 on a first datum line 41 is scraped off by the grinding tool 4 with the feed speed of the grinding tool 4 changed according to the cross-sectional area of the part 45, subsequently a part 46 of the excessive portion 31 on a second datum line 42 is scraped off by the grinding tool 4 with the feed speed of the grinding tool 4 changed according to the cross-sectional area of the part 46, and at last, a part 47 of the excessive portion 31 on a third datum line 43 is scraped off by the grinding tool 4 with the feed speed of the grinding tool 4 changed according to the cross-sectional area of the part 47.

Figure 15:
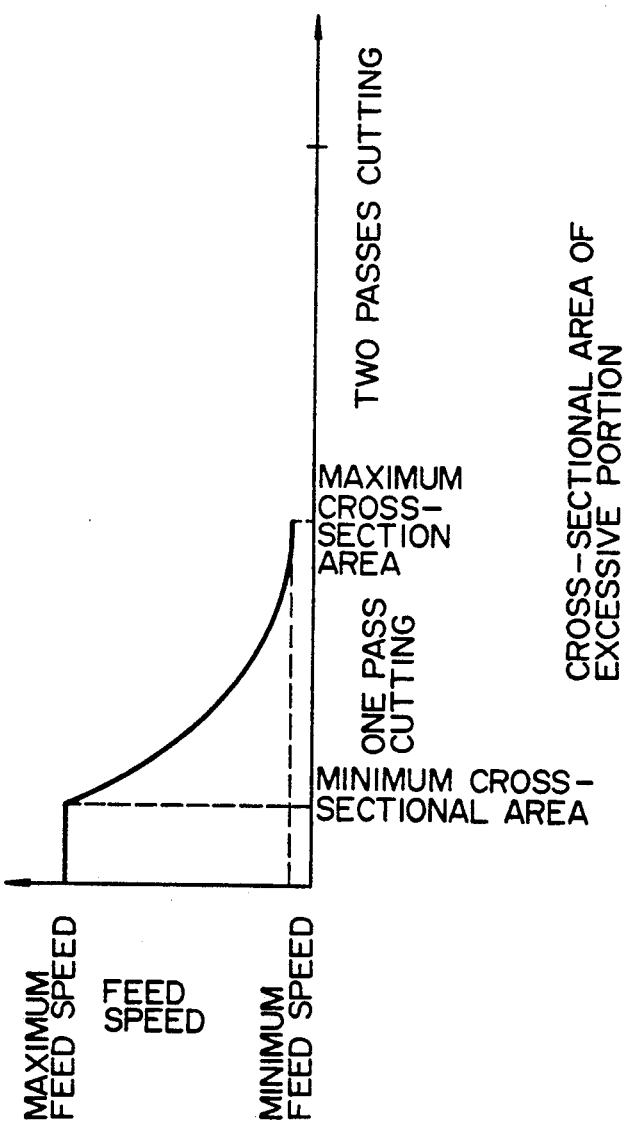
FIG. 15 is a diagram showing an optimum relation between the cross-sectional area of the excessive portion and the feed speed of the cutting tool.

FIG. 15 shows a relation between the feed speed of the grinding tool 4 in the direction of the grinding tool feed course and the cross-sectional area of the excessive portion 31 on the imaginary cross-sectional plane along the grinding tool feed course. An amount of the excessive portion 31 scraped off per unit time is substantially proportional to the product of the feed speed of the grinding tool 4 in the direction of the grinding tool feed course and the cross-sectional area of the excessive portion 31. The maximum amount of the excessive portion 31 scraped off per unit time is the maximum scraping off capability of the grinding tool 4. In the present invention, the product of the feed speed of the grinding tool 4 in the direction of the grinding tool feed course and the cross-sectional area of the excessive portion 31 on the imaginary cross-sectional plane or the forward end cutting plane moved along the grinding tool feed course ($\approx$ the amount of the excessive portion 31 scraped off per unit time) is kept at a constant degree or the maximum scraping off capability of the grinding tool 4 so that the larger the cross-sectional area of the excessive portion 31 on the imaginary cross-sectional plane or the forward end cutting plane is, the smaller the feed speed of the grinding tool 4 in the direction of the grinding tool feed course is, and the smaller the cross-sectional area of the excessive portion 31 on the imaginary cross-sectional plane or the forward end cutting plane is, the larger the feed speed of the grinding tool 4 in the direction of the grinding tool feed course is. The maximum feed speed of the grinding tool 4 is determined on the basis of the maximum permissible speed of the hand of the robot 1 and/or the minimum measurable cross-sectional area by the surface shape measuring sensor 2, the minimum feed speed of the grinding tool 4 is determined on the basis of the minimum permissible speed of the hand of the robot 1 and/or the maximum measurable cross-sectional area by the surface shape measuring sensor 2.

Figure 12:
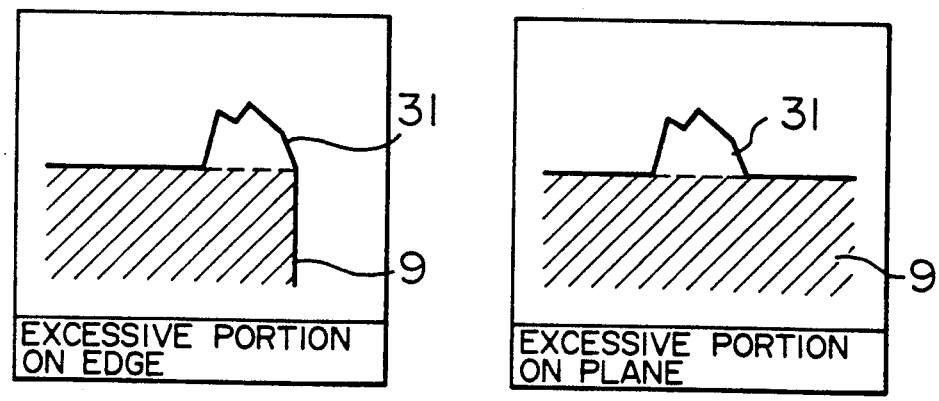
FIG. 12 is a schematic view showing a difference between the excessive portion on an edge of the workpiece and the excessive portion on a plane of the workpiece.

The terminal computer 5 determines the pressing force of the grinding tool 4 against the excessive portion 31 according to a radius of curvature of the desired surface shape of the workpiece 9 under the excessive portion 31. For example, when the desired surface shape of the workpiece 9 under the excessive portion 31 forms a rectangular corner and the excessive portion 31 is arranged on a side of the rectangular corner as shown in FIG. 12, the pressing force of the grinding tool 4 against the excessive portion 31 is 15N as shown in FIG. 14, and when the desired surface shape of the workpiece 9 under the excessive portion 31 forms a plane as shown in FIG. 12, the pressing force of the grinding tool 4 against the excessive portion 31 is 20N as shown in FIG. 14. When the radius of curvature of the desired surface shape of the workpiece 9 under the excessive portion 31 is small, the grinding tool 4 can easily penetrate into the workpiece 9 under the excessive portion 31 and the pressing force of the grinding tool 4 against the excessive portion 31 may be small. When the radius of curvature of the desired surface shape of the workpiece 9 under the excessive portion 31 is large, it is difficult for the grinding tool 4 to penetrate into the workpiece 9 under the excessive portion 31 and the pressing force of the grinding tool 4 against the excessive portion 31 must be large. A relation between the pressing force of the grinding tool 4 and the radius of curvature of the desired surface shape of the workpiece 9 under the excessive portion 31 may be predetermined more minutely. As shown in FIG. 13, the surface shape data of the excessive portion 31 is recorded in the terminal computer 5 with a data showing the radius of curvature of the desired surface shape of the workpiece 9 under the excessive portion 31.

The desired surface shape of the workpiece 9 under the excessive portion 31 or the radius of curvature of the desired surface shape of the workpiece 9 under the excessive portion 31 is obtained as follows. At first, a position of the excessive portion 31 measured by the surface shape measuring sensor 2 is calculated from the position and attitude of the hand of the robot 1 having the surface shape measuring sensor 2 and the distance measured by the surface shape measuring sensor 2 between the surface shape measuring sensor 2 and the surface of the workpiece 9. Thereafter, the desired surface shape of the workpiece 9 under the excessive portion 31 or the radius of curvature of the desired surface shape of the workpiece 9 under the excessive portion 31 on the calculated position of the excessive portion 31 measured by the surface shape measuring sensor 2 is read out from the desired surface shape data (design surface shape data) of the workpiece 9 recorded in the host computer 6.

Alternatively, when three cross points each of which is passed by three extension lines of three corners of the actual shape of the workpiece 9 measured by the surface shape measuring sensor 2 is imaginarily met by three cross points each of which is passed by three extension lines of three corners of the desired shape of the workpiece 9 recorded in the host computer 6, a projecting portion of the actual shape which projects from the desired shape is deemed to be the excessive portion 31 of the workpiece 9, and the desired surface shape under the projecting portion is deemed to be the desired surface shape of the workpiece 9 under the excessive portion 31.

As shown in FIG. 16, in order to prevent an excessive scraping off of the workpiece 9 caused by a positional error of the robot 1, the pressing force of the grinding tool 4 against the workpiece 9 and the feed speed of the grinding tool 4 along the feed course are controlled. When the action of the robot 1 is accurately controlled or a slightly excessive scraping off of the workpiece 9 is acceptable, a depth of cut by the grinding tool 4 into the workpiece 9 and a force for feeding the grinding tool 4 along the feed course are controlled.

Figure 17:
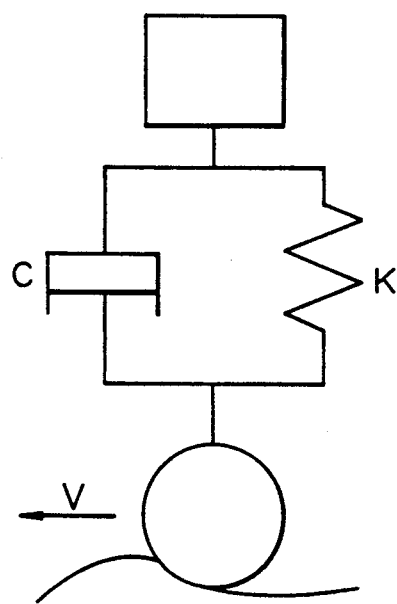
FIG. 17 is a schematic view showing a structure in which the pressing force F of the cutting tool against the excessive portion is controlled according to a formula of "F=k$\Delta$x+CV", when k is a spring constant of elastic member, $\Delta$x is a difference between a desired depth of cut and an actual depth of cut, C is a coefficient of viscosity of damper, V is a velocity of the cutting tool in the direction substantially perpendicular to the desired surface, and the formula is treated through a software.

The pressing force of the grinding tool 4 against the workpiece 9 may be controlled according to a virtual compliance method as shown in FIG. 17. The pressing force of the grinding tool 4 against the workpiece 9 is proportional to a difference between a desired position of the grinding tool 4 and an actual position thereof during the scraping off operation thereof. A viscoelastic coefficient C, elastic coefficient K may be changed according to the cross-sectional area of the excessive portion 31.

Both of the grinding tool 4 and the surface shape measuring sensor 2 may be mounted on the hand of the robot 1 so that the surface shape of the excessive portion 31 is measured at a forward side beyond the grinding tool 4 in the feed course by the surface shape measuring sensor 2.

Figure 18:
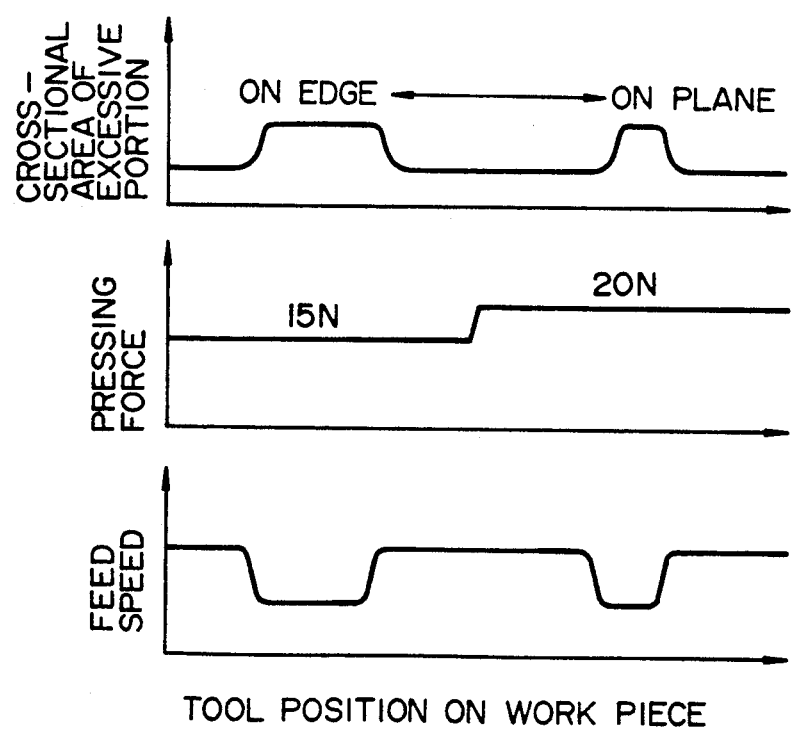
FIG. 18 is a diagram showing a relation among the position of the cutting tool, the measured cross-sectional area of the excessive portion scraped off by the cutting tool, the determined pressing force of the cutting tool and the calculated feed speed of the cutting tool.

FIG. 18 shows a relation among the position of the cutting tool 4, the cross-sectional area of the excessive portion 31 measured by the surface shape measuring sensor 2, the pressing force of the cutting tool 4 and the feed speed of the cutting tool 4, according to the present invention.

Figure 19:
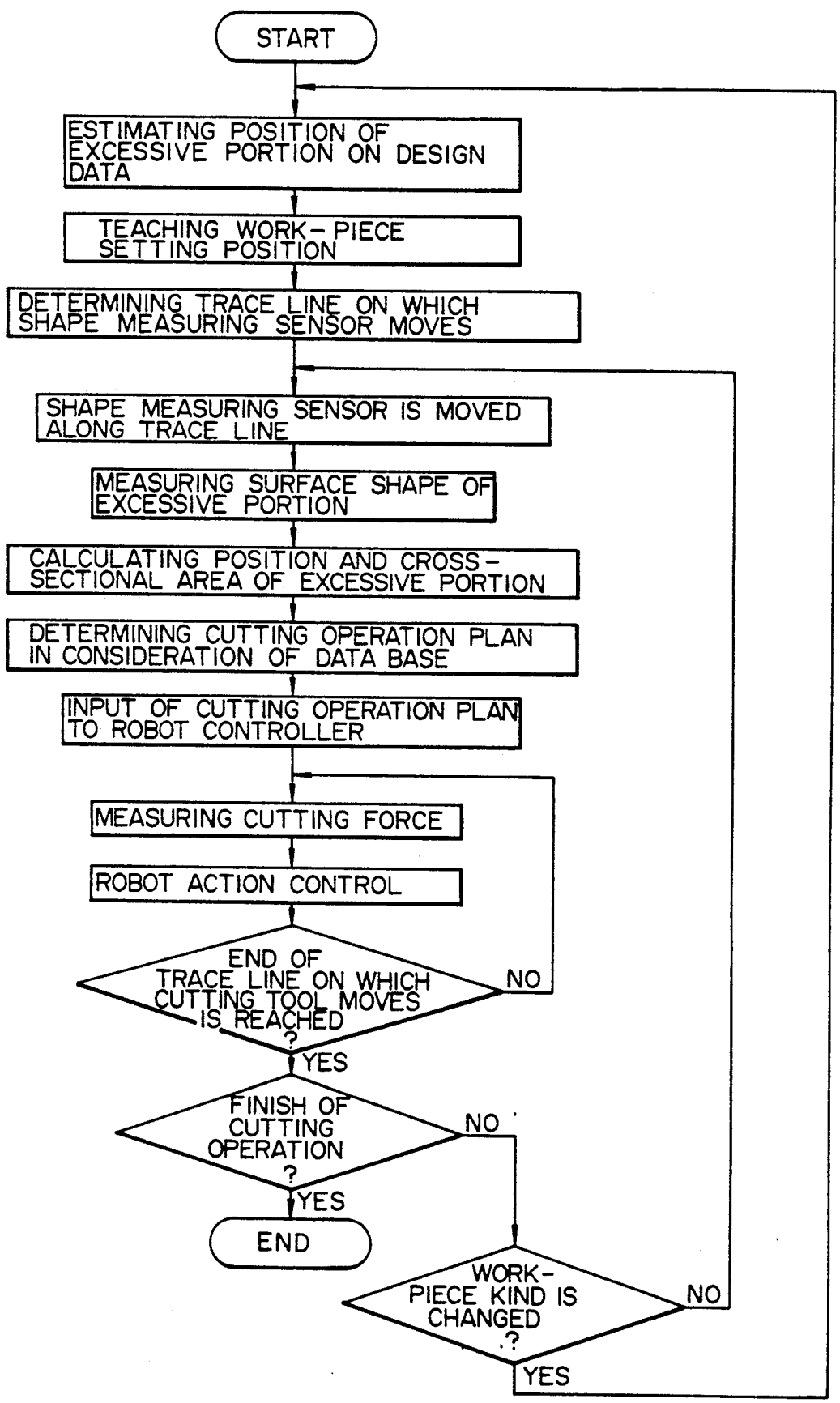
FIG. 19 is a flowchart of the automatic excessive portion scraping off method according to the present invention.

In a flowchart of finishing robot as shown in FIG. 19, at first, a desired shape (design shape) of a workpiece is inputted to a robot controller, an operator points out a position at which an excessive portion may be formed on the workpiece, and a positional relation between the robot and the workpiece is inputted to the robot controller, so that a measuring sequence of finishing robot for measuring a surface shape of the excessive portion is determined. According to the determined measuring sequence, a sensor mounted on the robot measures the surface shape of the excessive portion. A scraping-off sequence of finishing robot for scraping off the excessive portion is determined from the measured surface shape of the excessive portion on the basis of a predetermined relation among a desired surface shape of workpiece, a surface shape of excessive portion, a preferable feed speed of cutting tool, a preferable pressing force of cutting tool and a preferable number of feed operations of cutting tool. According to the determined scraping-off sequence, the excessive portion is scraped off by the cutting tool on the robot with a feedback control for keeping the pressing force of the cutting tool at a preferable degree. It is not necessary for the excessive portion of another workpiece to be scraped off, the robot operation is finished. If it is necessary for the excessive portion of the another workpiece to be scraped off and a kind of the another workpiece is different from that of the previous workpiece, a desired shape (design shape) of the another workpiece is inputted to the robot controller, and subsequently, the above sequences are repeated. If it is necessary for the excessive portion of the another workpiece to be scraped off and the kind of the another workpiece is equal to that of the previous workpiece, the sensor measures the surface shape of the excessive portion of the another workpiece according to the previously determined measuring sequence, and subsequently, the above sequences are repeated.

What is claimed is:

1. A method for scraping off automatically an excessive portion of a workpiece by a cutting tool, comprising the steps of:
   measuring a surface shape of the excessive portion of the workpiece,
   calculating a cross-sectional area variation of the excessive portion substantially along a feed course in which the cutting tool will proceed during a cutting operation thereof, from the measured surface shape of the excessive portion, and
   scraping off the excessive portion in the feed course with a feed speed of the cutting tool which is changed substantially in accordance with the calculated cross-sectional area variation of the excessive portion along the feed course, so that the larger the calculated cross-sectional area of the excessive portion is, the smaller the feed speed of the cutting tool is, and the smaller the calculated cross-sectional area of the excessive portion is, the larger the feed speed of the cutting tool is.

2. A method according to claim 1, wherein a predetermined point of the cutting tool proceeds in the feed course during the cutting operation thereof.

3. A method according to claim 1, wherein the cross-sectional area variation of the excessive portion along the feed course on a plane including a line substantially perpendicular to the feed course is calculated.

4. A method for scraping off automatically an excessive portion projecting from a datum face of a workpiece by a cutting tool, comprising the steps of:
   selecting a datum face in a region of the workpiece where the excessive portion is absent,
   measuring in three dimensions a surface shape of the excessive portion of the workpiece projecting from the datum face,
   calculating areas of two-dimensional cross-sectional shapes of the excessive portion projecting from the datum face at intervals along each of a series of corresponding feed courses,
   after calculating the two-dimensional areas, scraping off the excessive portion along each feed course with the cutting tool by feeding the cutting tool along each of the moving feed courses while controlling a speed of the cutting tool in a moving direction, the speed of the cutting tool along each feed course being substantially inversely proportional to the corresponding calculated two-dimensional area.

5. A method according to claim 1, wherein a datum line is imaginarily set in the workpiece, and the cross-sectional area variation of the excessive portion along the feed course on a plane including the datum line is calculated.

6. A method according to claim 1, wherein the cross-sectional area variation of the excessive portion along the feed course on a plane substantially perpendicular to the feed course is calculated.

7. A method according to claim 1, wherein the cross-sectional area variation of the excessive portion along the feed course on a plane which will be formed between the cutting tool and the excessive portion during the cutting operation thereof is calculated.

8. A method according to claim 2, wherein the cutting tool rotates on a rotational axis during the cutting operation, and the predetermined point is arranged on the rotational axis.

9. A method according to claim 2, wherein the predetermined point contacts with the excessive portion to be scraped off.

10. A method according to claim 2, wherein the cutting tool rotates on a rotational axis during the cutting operation, and the predetermined point is arranged on a plane which will be formed between the cutting tool and the excessive portion during the cutting operation thereof.

11. A method according to claim 2, wherein the largest depth of cut of the cutting tool into the workpiece is formed by the predetermined point.

12. A method according to claim 4, wherein the datum face is included by a desired surface of the workpiece.

13. A method according to claim 4, wherein the datum face is substantially parallel to a desired surface of the workpiece.

14. A method according to claim 4, wherein the datum face is included by at least a part of an actual surface of the workpiece other than the excessive portion.

15. A method according to claim 4, wherein the datum face extends between two points included by an actual surface of the workpiece other than the excessive portion.

16. A method according to claim 5, wherein the datum line in included by a desired surface of the workpiece.

17. A method according to claim 5, wherein the datum line is substantially parallel to a desired surface of the workpiece.

18. A method according to claim 5, wherein the datum line is included by at least a part of an actual surface of the workpiece other than the excessive portion.

19. A method according to claim 5, wherein the datum line extends between two points included by an actual surface of the workpiece other than the excessive portion.

20. A method according to claim 1, wherein a datum line is imaginarily set in the workpiece, and a cross-sectional area of the excessive portion extending outwardly from the datum line is the cross-sectional area of the excessive portion.

21. A method according to claim 20, wherein the datum line is included by a desired surface of the workpiece.

22. A method according to claim 20, wherein the datum line is substantially parallel to a desired surface of the workpiece.

23. A method according to claim 20, wherein the datum line is included by at least a part of an actual surface of the workpiece other than the excessive portion.

24. A method according to claim 20, wherein the datum line extends between two points included by an actual surface of the workpiece other than the excessive portion.

25. A method according to claim 1, wherein a datum line is imaginarily set in the workpiece, and a total amount of a cross-sectional area of the excessive portion extending outwardly from the datum line and a cross-sectional area of a part of the workpiece which extends inwardly from the datum line into the workpiece and which will be scraped off by the cutting tool during the cutting operation are the cross-sectional area of the excessive portion.

26. A method according to claim 25, wherein the datum line is included by a desired surface of the workpiece.

27. A method according to claim 25, wherein the datum line is substantially parallel to a desired surface of the workpiece.

28. A method according to claim 25, wherein the datum line is included by at least a part of an actual surface of the workpiece other than the excessive portion.

29. A method according to claim 25, wherein the datum line extends between two points included by an actual surface of the workpiece other than the excessive portion.

30. A method according to claim 1, wherein the feed course extends substantially parallel to a longitudinal direction of the excessive portion.

31. A method according to claim 1, wherein the product of the feed speed of the cutting tool and the calculated cross-sectional area of the excessive portion is substantially constant.

32. A method according to claim 1, wherein the feed course extends substantially parallel to a desired surface shape of the workpiece.

33. A method according to claim 1, wherein a cross-sectional area variation of a part of the excessive portion along the feed course is calculated from the measured surface shape of the excessive portion, and the part of the excessive portion is scraped off in the feed course with the feed speed of the cutting tool which is changed substantially in accordance with the calculated cross-sectional area variation of the part of the excessive portion along the feed course, so that the larger the calculated cross-sectional area of the part of the excessive portion is, the smaller the feed speed of the cutting tool is, and the smaller the calculated cross-sectional area of the part of the excessive portion is, the larger the feed speed of the cutting tool is.

34. A method according to claim 1, wherein the feed course includes an imaginary face which divides the excessive portion along a width direction into two substantially equal parts.

35. A method according to claim 1, wherein the feed course includes an imaginary face which divides the cross-sectional area of the excessive portion into two substantially equal parts.

36. A method according to claim 1, wherein the feed course includes an imaginary face which extends substantially perpendicularly to a desired surface of the workpiece.

37. A method for scraping off automatically an excessive portion of a workpiece by a cutting tool, the method comprising the steps of:

measuring a surface shape of the excessive portion of the workpiece;

from the measured surface shape, pre-calculating a cross-sectional area variation of the excessive portion substantially along a proposed feed course;

setting a feed speed of the cutting tool in accordance with the pre-calculated cross-sectional area variation of the excessive portion along the feed course, such that the larger the pre-calculated cross-sectional area of the excessive portion is, the smaller the feed speed of the cutting tool along the feed course is, and the smaller the pre-calculated cross-sectional area of the excessive portion is, the larger the feed speed of the cutting tool along the feed course is;

after pre-calculating the cross-sectional area variation, moving the cutting tool along the feed course with the set feed speed to scrape off the excessive portion along the feed course.

* * * * *